(12) United States Patent
Neigovzen et al.

(10) Patent No.: US 7,895,142 B2
(45) Date of Patent: Feb. 22, 2011

(54) METHOD AND APPARATUS FOR QUANTUM ADIABATIC PATTERN RECOGNITION

(75) Inventors: Rodion Neigovzen, Munich (DE); Rudolf Sollacher, Eching (DE)

(73) Assignee: Siemens Aktiengesellschaft, Munich (DE)

(*) Notice: Subject to any disclaimer, the term of this patent is extended or adjusted under 35 U.S.C. 154(b) by 817 days.

(21) Appl. No.: 11/862,604

(22) Filed: Sep. 27, 2007

(65) Prior Publication Data

US 2009/0087084 A1    Apr. 2, 2009

(51) Int. Cl.
*G06F 17/00* (2006.01)
*G06N 5/00* (2006.01)

(52) U.S. Cl. .................................................. 706/45
(58) Field of Classification Search .................. 706/45
See application file for complete search history.

(56) References Cited

U.S. PATENT DOCUMENTS

2008/0086438 A1* 4/2008 Amin et al. .................. 706/33

OTHER PUBLICATIONS

Kinjo et al. "Quantum Adiabatic Evolution Algorithm for a Quantum Neural Network", ICANN, 2003, LNCS 2714, pp. 951-958.*
Dam et al. "How powerful is Adiabatic Quantum Computation", Proc. 42nd IEEE FCS, 2001, pp. 279-287.*
M. Andrecut et al.; "Quantum Associative Memory"; International Journal of Modern Physics B; vol. 17, No. 12, (2003); pp. 2447-2472.
C. A. Trugenberger, "Quantum Pattern Recognition"; Quantum Information Processing, vol. 1, No. 6, Dec. 2002; pp. 471-493.
C. A. Trugenberger, "Probabilistic Quantum Memories"; Physical Review Letter, vol. 87, No. 6, Aug. 2001; pp. 067901-1 to 067901-4.
R. Schutzhold, "Pattern Recognition on a Quantum Computer", Physical Review A, vol. 67, 062311, 2003, pp. 062311-1 to 062311-6.
Y. Ma et al., "Statistical Mechanics of a Hopfield Neural-Network Model in a Transverse Field", Physical Review E, vol. 47, No. 6, Jun. 1993, pp. 3985-3987.
J. J. Hopfield; "Neural Networks and Physical Systems with Emergent Collective Computational Abilities"; Proc. Natl Acad. Sci,, Apr. 1982, vol. 79, pp. 2554-2558.
M. Zak; "Quantum Algorithms in Hilbert Database"; International Journal of Theoretical Physics, vol. 42, No. 9, Sep. 2003; pp. 2061-2068.
D. Curtis et al.; "Towards Quantum Template Matching"; Proceedings of SPIE—Quantum Communications and Quantum Imaging, vol. 5161, Feb. 2004, pp. 134-141.

(Continued)

*Primary Examiner*—Michael B. Holmes
*Assistant Examiner*—Li-Wu Chang
(74) *Attorney, Agent, or Firm*—Staas & Halsey LLP

(57) ABSTRACT

Methods and apparatuses for pattern recognition involve quantum-mechanical calculations. Pattern recognition can be achieved by considering a quantum system and its Hamiltonian dynamics. The dynamics are calculated on the basis of an initial Hamiltonian indicating an initial quantum state and on the basis of a final Hamiltonian. The final Hamiltonian depends on an input pattern and reference patterns. Transformations according to the Hamiltonian dynamics for the quantum system are applied to generate a final quantum state of said quantum system. Depending on said final quantum state a similarity between said input pattern and said reference patterns is determined.

22 Claims, 9 Drawing Sheets

OTHER PUBLICATIONS

M. C. Diamantini, "Quantum Pattern Retrieval by Qubit Networks with Hebb Interactions", Physical Review Letters, PRL 97, 2006, pp. 130503-1 to 130503-4.

A. A. Ezhov et al., "Quantum Associative Memory with Distributed Queries", Information Sciences 128, 2000, pp. 271-293.

O. Kaynak et al., "Quantum Adiabatic Evolution Algorithm for a Quantum Neural Network", ICANN/ICONIP 2003, LNCS 2714, Springer-Verlag, pp. 951-958.

P. Mateus, "Quantum Pattern Matching", Institute Superior Técnico, Aug. 2005, arXiv:quant-ph/0508237 v1, pp. 1-5.

Y. Nonomura et al, "Quantum Hopfield Model", Tokyo Institute of Technology, Dec. 1995, arXiv.cond-mat/9512142 v1, pp. 1-11.

M. Pons et al., "Trapped ion chain as a neural network", Universidad del Pais Vasco, Spain, Dec. 2005, arXiv:cond-mat/0512606 v1, pp. 1-4.

D. Ventura et al., "Quantum Associative Memory", Information Sciences 123, 2000, pp. 273-296.

E. C. Behrman et al., A Quantum Hopfield Network, Proceedings of the Fifth Joint Conf. on Information Sciences, vol. 1, 2000, pp. 760-762.

D. Ventura, "Pattern Classification Using a Quantum System", Proceedings of the Joint Conf. on Information Sciences (JCIS 2002), Mar. 2002, pp. 537-540.

J. Shlens, "A Tutorial on Principal Component Analysis", printed from www.snl.salk.edu/~shlens/pub/notes/pca.pdf on Feb. 7, 2007, pp. 1-13.

* cited by examiner

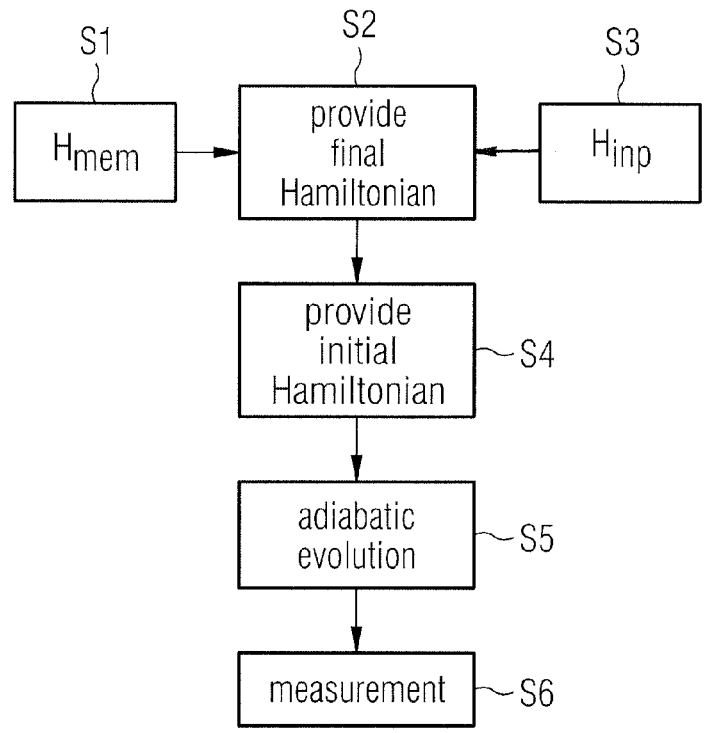
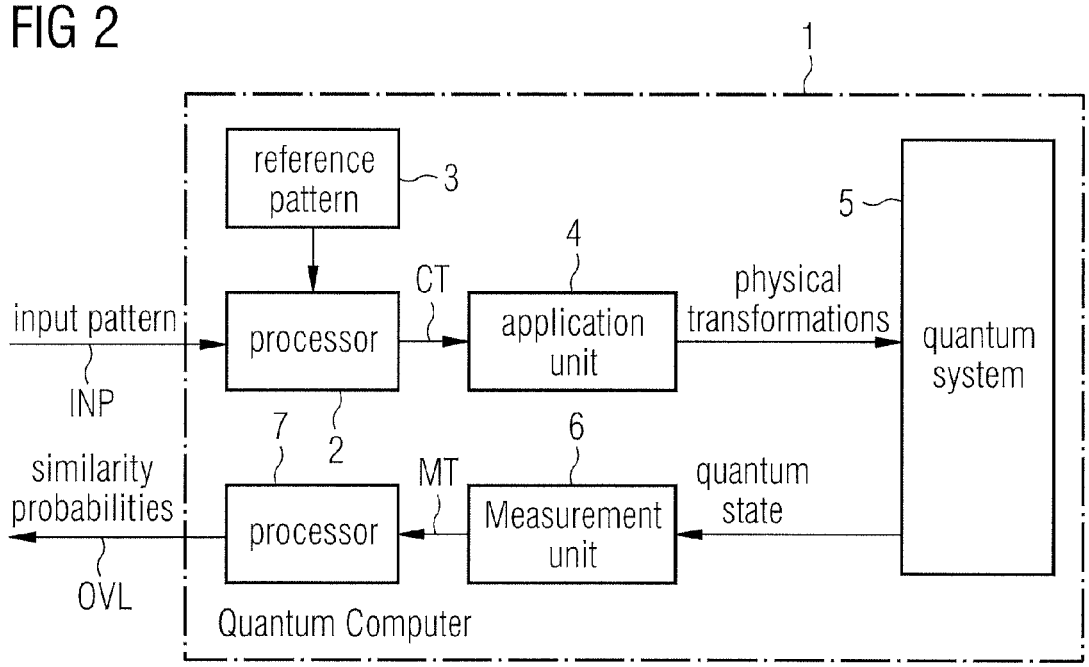

METHOD AND APPARATUS FOR QUANTUM ADIABATIC PATTERN RECOGNITION

BACKGROUND OF THE INVENTION

The invention relates to pattern recognition and, more particularly, to pattern recognition involving computing with quantum computers.

In pattern recognition, input data is processed based on a priori knowledge in form of stored reference patterns. Recognizing input data or input patterns means classifying the input pattern depending on which one of the reference patterns resembles best the input pattern. Applications for pattern recognition include, for example, voice and speech recognition, text classification or digital image analysis.

Conventional pattern recognition is, for instance based on neural networks or particular search algorithms. Usually, the computational effort, in particular, if implemented on a computer is extremely high for such pattern recognition tasks. Employing quantum mechanics may facilitate and speed-up search applications over unsorted data significantly. Such search applications over unsorted data may also be regarded as a pattern recognition as mentioned above. The advantage of a quantum-mechanical framework is mainly due to the fact that quantum-mechanical systems can be represented by a superposition of states that can be influenced or manipulated simultaneously by quantum-mechanical operations performed on such states. It is also possible that quantum states of two or more objects are described with respect to one another. This is referred to as an entanglement of states. Quantum-mechanics based algorithms are believed to exceed the computational efficiency of traditional computers and may be implemented as quantum-mechanical simulations on conventional computers as well as physical implementations of quantum-computers in terms of quantum systems.

SUMMARY OF THE INVENTION

This disclosure presents methods and apparatuses for performing quantum-mechanical calculations. Specifically, it is demonstrated that pattern recognition can be achieved by considering a quantum-system and its Hamiltonian dynamics. The dynamics may be calculated on the basis of an initial Hamiltonian indicating an initial quantum state and on the basis of a final Hamiltonian. The final Hamiltonian can be calculated depending on an input pattern and reference patterns. Transformations according to the Hamiltonian dynamics for the quantum system are applied to generate a final quantum state of said quantum system. Depending on said final quantum state a similarity between said input pattern and said reference patterns is determined.

The pattern recognition based on quantum dynamics may be applied to a variety of cases and search problems over unsorted data.

BRIEF DESCRIPTION OF THE DRAWINGS

In the following, aspects and embodiments of the invention are described with reference to the figures in the drawings.

FIG. 1 shows a flow-chart of a variety of a method for pattern recognition based on quantum-mechanical computing.

FIG. 2 shows a block diagram of one embodiment of a quantum computer for pattern recognition.

In the figures, all like or functionally like elements have been assigned the same reference characters if not otherwise indicated.

DETAILED DESCRIPTION

Introduction

Figure 3:
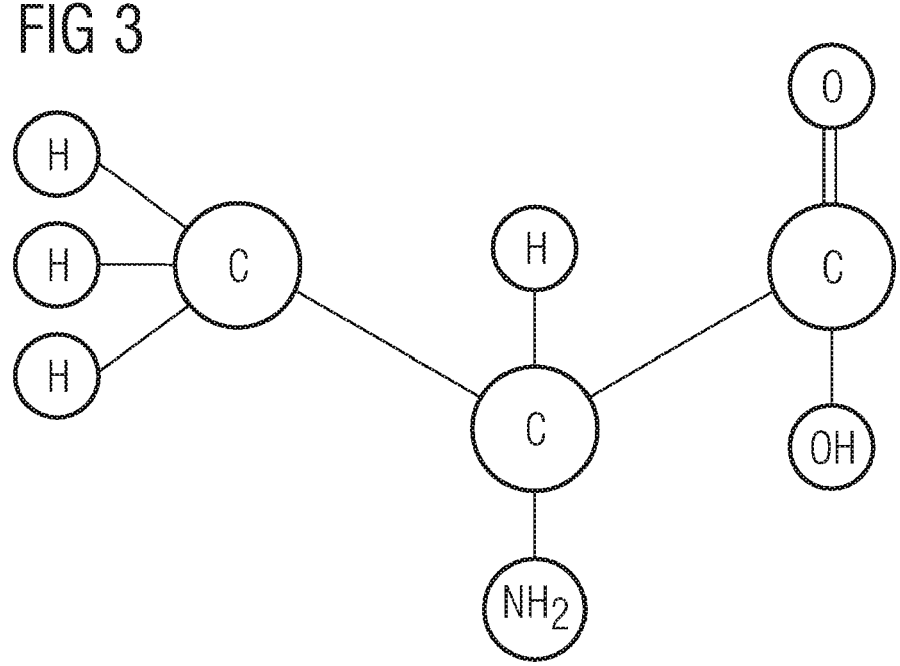
FIG. 3 shows a structural formula of alanine.

Quantum information processing combines the ideas of classic computer science and quantum theory. The time evolution of quantum-mechanical systems can be used to efficiently perform very complex calculations. This is mainly due because in quantum mechanics a system can be described by a plurality of simultaneous quantum-mechanical states evolving in time. Each time a measurement is performed on a single quantum-mechanical system the system collapses into one of those states, wherein the states have a different probability to be measured. It is further possible that states of separate quantum systems are entangled, and entangled states are employed in quantum computation. Another variety of quantum mechanical phenomena occur in ensembles of quantum systems. In this case the state of a system comprising a large number of copies of the same quantum-mechanical system is described by a density matrix. All of the above mentioned quantum systems and other may be employed in implementations of quantum computation.

An exemplary quantum computer system can be represented by bi-state quantum systems which are also called qubits (quantum bits). A physical embodiment of such a quantum-bit can be two distinguishable states of atoms or ions. For example, angular momentum quantum states or polarization states of photons or states of elementary particles can be used as qubits. The two states of qubits are usually described by vectors $$|0\rangle = \begin{pmatrix} 1 \\ 0 \end{pmatrix} |1\rangle = \begin{pmatrix} 0 \\ 1 \end{pmatrix}. \quad (1)$$

Also other entities can be used ion quantum computation. E. g. quantum-d-bits where d=3 are known, wherein a bra-ket representation can be defined as: $|\uparrow\rangle, |\downarrow\rangle, |\rightarrow\rangle$). Generally, may acquire any natural number. In the remainder of this disclosure, as exemplary quantum computing entities, qubits (d=2) are considered for the sake of simplicity.

Since quantum-mechanical systems allow superpositions of such q-ubit quantum states, a general qubit pure state has the form:

$$|\psi\rangle = \alpha|0\rangle = +\beta|1\rangle = \begin{pmatrix} \alpha \\ \beta \end{pmatrix} \text{ with} \quad (2)$$

$$|\alpha|^2 + |\beta|^2 = 1 \text{ and } \alpha, \beta \in C.$$

The time evolution of such a state $|\Psi\rangle$ is governed by the Schrödinger equation:

$$i\hbar \partial_t |\psi(t)\rangle = H(t)|\psi(t)\rangle. \quad (3)$$

If the Hamiltonian H is not explicitly time-dependent starting from an initial state $|\Psi(t=0)\rangle$ the time evolution of this state $|\Psi(t=0)\rangle$ in terms of equation (3) can be written as $$|\psi(t)\rangle = \exp\left(-\frac{iHt}{\hbar}\right) \cdot |\psi(0)\rangle. \quad (4)$$

In quantum computation, a quantum-register of length N is a direct product of N qubits. Further, in quantum mechanics, a superposition of all possible conventional register states can be realized at the same time relating to $2^N$ possible states. Taking the state $|\psi_0\rangle = |0\rangle|0\rangle \ldots |0\rangle$ and applying a well-known Hadamard-transform the state can be written as $$|\psi_0\rangle = \frac{1}{2^{N/2}} \sum_{k=0}^{2^N-1} |k\rangle. \quad (5)$$

k designates an index for basis states.

A unitary transformation, such as the time evolution, on this state requires only one computational step because the quantum-mechanical transformations are linear. Hence, an operation of a linear operator simultaneously acts on all the basis states $|k\rangle$. Therefore, a massive parallel computation based on quantum superpositions is enabled.

In a quantum computer, states evolve in time according to the Hamiltonian describing this quantum system, and a specific Hamiltonian or quantum system, respectively, can be used for modeling classically very cumbersome calculations. One aspect of the invention employs such quantum-mechanical issues for pattern recognition where input data which is a pattern to be recognized is quantum-mechanically processed based on an a-priori knowledge in terms of a set of stored reference patterns. The input pattern is then classified and recognized as one or more of the reference patterns which the input pattern resemble.

This aspect of the invention may apply to a variety of pattern recognition tasks, for example voice and speech recognition, text classification, recognition of patterns in heterogeneous characteristics, such as a medical diagnosis on the basis of a large number of medical records or the analysis of financial market data. Signature recognition may also be a field to which quantum-mechanical pattern recognition may be employed. In addition gaming strategies involving decision with respect to certain patterns or ramifications in a decision tree can be mapped onto a quantum mechanical problem.

According to another aspect of the invention, an associative memory may be realized that stores and recalls information on the basis of a partial knowledge of its content by mapping a specific input pattern to a specific output pattern. Applications for this associative memory range from content-addressable memory as a special type of computer memory, data base engines or data compression methods.

Quantum-Adiabatic Time Evolution

In one embodiment of the invention, a quantum-mechanical system is prepared in an initial state and adiabatically transferred to a final state. This is done through adiabatic time evolution. The time evolution is then governed by weight functions and interaction-like Hamiltonians taking into account the memory patterns or reference patterns, respectively. The exemplary method for pattern recognition and associative memory addresses binary patterns of the size N based on a quantum-mechanical system containing N qubits and involves driving the system to a desired state through adiabatic time evolution.

FIG. 1 shows an exemplary flowchart of an implementation of a method, for example for pattern recognition, employing a quantum-adiabatic protocol. In steps S1 and S3, a Hamiltonian $H_{mem}$, referring to a quantum system depending on a plurality of reference patterns and a Hamiltonian $H_{inp}$ referring to an input pattern to be recognized is provided. The symbols $H_{mem}$ and $H_{inp}$ relate to quantum systems or properties of quantum systems depending on the memorized reference patterns or the input pattern. In a physical implementation of the quantum system comprising either memorized reference patterns and/or the input pattern or patterns at the end of the quantum-mechanical calculation, a final Hamiltonian relating to a final quantum system shall be subject to a measurement. Hence, a final Hamiltonian, for example, can be written as $$H_{final} = H_{mem} + H_{inp} \quad (6)$$

In FIG. 1, the preparation or provision of the final Hamiltonian is performed in step S2.

However, since it is mathematically and physically difficult to control such complex Hamiltonians, and in particular ground states as a start value for the eventual computation are not always feasible, according to the quantum-adiabatic strategy, first an initial or beginning Hamiltonian $H_{init}$, for example relating to a quantum system having a ground state which is easy to prepare is provided. Eventually, this beginning Hamiltonian or the corresponding quantum system, respectively, is adiabatically transferred to the final Hamiltonian or quantum system, respectively, thereby considering all elements contributing to the final quantum system, i. e. the actual physical implementation of the quantum system and initial and final Hamiltonians. The time evolution of this quantum system is then calculated by a simulation, or in a quantum-mechanical implementation the physical system will evolve in time. This adiabatic and controlled shift from the relatively simple initial Hamiltonian $H_{init}$ to a complex final Hamiltonian $H_{final}$ can be written as:

$$H(s) = f(s) H_{init} + g(s) H_{final} \quad (7)$$

The parameter s runs from 0 to 1 and the functions f(s) and g(s) are weight functions, wherein f(0)=1, f(1)=0 and g(0)=0, g(1)=1. One example for weight functions f and g is, for example, a linear interpolation for the total running time T of a quantum-computer calculation:

$$H(t) = \left(1 - \frac{t}{T}\right)H_{init} + \frac{t}{T}H_{final}. \tag{8}$$

At t=0, the ground state of the initial quantum system $H_{init}$ is produced. In the adiabatic limit for t=T, the actual quantum state of $H_{final}$ is produced.

In step S4, referring to FIG. 1, the initial Hamiltonian is provided. However, the sequence of preparing the relevant quantum systems relating to $H_{mem}$ or $H_{inp}$ can be changed.

In the following step S5, the adiabatic time evolution according to equation (8) is performed. The time evolution can be suitably governed by a unitary transformation with discrete time steps $\Delta t$ according to $$|\psi(t + \Delta t)\rangle = U(t)|\Psi(t)\rangle = \exp\left(-\frac{iH(t)\Delta H}{\hbar}\right)|\psi(t)\rangle. \tag{9}$$

After letting the prepared complex quantum system comprising Hamiltonians for the input patterns and the reference patterns evolve in time, a measurement in step S6 is performed. This leads to a value of an observable relating to a similarity measure between the input pattern and the reference patterns. This can be, for example, an overlap integral between quantum states referring to input patterns and the actual quantum state of the quantum system. Consequently, the quantum-mechanical physical measurement through which the quantum-system collapses into one state, leads to the quantum computational result. In implementations where ensembles of quantum systems are involved also ensemble states may be considered instead.

Initial Hamiltonians

Considering a quantum-register with N qubits, a ground state for a blank memory, i.e. with states having the same probability, can be written as:

$$|\psi(0)\rangle = |\psi_{init}\rangle = \frac{1}{\sqrt{2^N}} \sum_{k=0}^{2^N - 1} |k\rangle \tag{10}$$

A variety of Hamiltonians that are suitable as an initial Hamiltonian for equation (10) may be employed. For example:

$$H_{init}^1 = \frac{1}{2} \sum_i (1_1 - K\sigma_i^x) \tag{11}$$

$$H_{init}^2 = \frac{1}{2}(-K\sigma_i^x)$$

$$H_{init}^3 = -\frac{1}{4} \sum_{ij} \sigma_i^x \sigma_j^x + \frac{1}{2} \sum_i (-\sigma_i^x)$$

$$H_{init}^4 = 1 - K|\psi_{init}\rangle\langle\psi_{init}|$$

$$H_{init}^5 = -K|\psi_{init}\rangle\langle\psi_{init}|$$

The index i refers to the qubits, $1_r$ refers to the unity matrix for r qubits and $$\sigma_i^\omega = 1_1 \otimes \ldots \otimes \underset{i\text{-thqubit}}{\sigma^\omega} \otimes \ldots \otimes 1_1$$

with $\omega=x, y, z$, and K is set to K=1, and $\sigma^\omega$ refers to the Pauli-matices.

Departing from a basis state $$|\psi(0)\rangle = |\psi_0\rangle = |00\ldots 0\rangle \tag{12}$$

initial Hamiltonians are also feasible:

$$H_{init}^6 = \frac{1}{2} \sum_i (-\sigma_i^z), \tag{13}$$

$$H_{init}^7 = 1 - K|\psi(0)\rangle\langle\psi_0|.$$

Again, K is set to unity K=1 for example.

Final Hamiltonians

The final Hamiltonian as shown in equation (6) comprises terms depending on the memorized reference patterns and the input pattern to be recognized. In the following, two exemplary memory Hamiltonians are presented. For example, a spin-spin interaction Hamiltonian may be used as memory Hamiltonian:

$$H_{mem}^1 = -\frac{1}{2} \sum_{i \neq j} J_{ij} \sigma_i^z \sigma_j^z. \tag{14}$$

Indices $i, j=1, \ldots N$ refer to qubits, $J_{ij}$ can be regarded as a weight matrix, and $\sigma_i^z$ stands for the Pauli-matrix for the ith qubit. p reference patterns $\{\xi^\mu\}$ with $\mu$ running from 1 to p, and $\xi_i^\mu = \pm 1$. For example, the weight matrix can be written as a Hebbian matrix:

$$J_{ij} = \frac{1}{N} \sum_{\mu=1}^p \xi_i^\mu \xi_j^\mu, \tag{15}$$

or alternatively in the terms of a projection rule:

$$J_{ij} = \frac{1}{N} \sum_{lm} \xi_i^l (Q^{-1})_{lm} \xi_j^m \text{ with } Q_{lm} = \frac{1}{N}(\xi^l)^T \xi^m. \tag{16}$$

The weight matrix models symmetric interactions which resembles the situation in conventional Hopfield networks. Every neuron can receive an input from any other one and may send an output to the other one. A Hopfield net is a recurrent neural network that may serve as content-addressable memory system.

Alternative interactions or weight matrices are feasible, wherein a mathematical transformation is applied to J. For example, the connection strength may acquire discrete values, or the values of the connection strength $J_{ij}$ may be clipped. Other types of interaction Hamiltonians can also be contemplated. For example, higher order interaction contributions involving more complex tensors for connecting more than two spins may be used. Such components may have the form: $H_{mem} \propto \Sigma J_{ijk} \sigma_i^z \sigma_j^z \sigma_k^z$.

Alternative memory Hamiltonians may be employed if an associative memory is to be realized by the quantum-system. Such "oracle" Hamiltonians may read:

$$H_{mem}^2 = 1 - K \sum_\mu |\xi_\mu\rangle\langle\xi_\mu| \quad (17)$$

$$H_{mem}^3 = -K \sum_\mu |\xi_\mu\rangle\langle\xi_\mu|$$

$$H_{mem}^4 = 1 - K|\xi_{mem}\rangle\langle\xi_{mem}|$$

$$H_{mem}^5 = -K|\xi_{mem}\rangle\langle\xi_{mem}|$$

The memory state is defined as $$\xi_{mem} = C \sum_\mu |\xi_\mu\rangle$$

wherein C is a normalization constant.

Yet another implementation of a memory Hamiltonian is referred to as a hybrid Hamiltonian, wherein:

$$H_{mem}^6 = \sum_\mu H_{mem}^\mu \text{ wherein } H_{mem}^\mu = \sigma^{\xi_1^\mu} \otimes \sigma^{\xi_2^\mu} \otimes \ldots \otimes \sigma^{\xi_N^\mu} \quad (18)$$

with $\sigma^k = \frac{1}{2}(1_1 - k\sigma^z)$.

The above presented memory Hamiltonians rely on a-priori knowledge on reference patterns $\xi_\mu$. Next, alternatives for retrieval Hamiltonians depending on input patterns are presented.

Input Pattern Hamiltonians

An input pattern $\xi_{inp}$ leads to additional Hamiltonians $H_{inp}$ that impose constraints on the Hamiltonian dynamics of the quantum-system. This is similar to the dynamics of a conventional neural network. In one implementation, a bias Hamiltonian is defined as:

$$H_{inp}^1 = \Gamma \sum_i \xi_i^{inp} \sigma_i^z, \quad (19)$$

wherein $\Gamma$ is an appropriate weight factor, and $\xi^{inp}$ refers to the input pattern.

This additional field in the final Hamiltonian of equation (6) creates a scalar metric permitting a comparison between the input pattern and the memory patterns. Additionally, this bias Hamiltonian removes the degeneration of the ground state of the Hamiltonian $H_{mem}$ in favor of patterns which have a large overlap with the input pattern. The bias Hamiltonian $H_{inp}$ shifts the equally distributed weights of the memory states $|\xi_{mem}\rangle$ or reference patterns, respectively, depending on the Hamming distances between the input patterns and the reference patterns. Hence, the combination of memory Hamiltonians and the bias Hamiltonian, or the corresponding quantum-mechanical systems, respectively, allows the measurement of a similarity between the stored reference patterns and the input patterns.

A combination of equations (14) and (19) resembles the energy in terms of a Hopfield network. Hence, mathematical or physical problems that may be tackled by Hopfield-like networks, are also feasible to quantum computation in terms of this disclosure. One example is the traveling salesman problem where a shortest circuit visiting all cities or stations according to a list is determined. However, each city is to be visited only once. This is known an "NP-complete" optimization problem. Regarding the Hamiltonians used for pattern recognition, e. g. equations (14) and (19) the interaction matrix $J_{ij}$ may represent information on the stations and their distances with respect to one another and the input Hamiltonian may apply further constraints to the path or journey to be determined. As a result the quantum mechanical computation employing the adiabatic evolution leads to a best pattern or parameterized path for the corresponding Hopfield Tank problem.

In the case when the input pattern is incomplete, i. e. the length n of the pattern vector is shorter than the length N of the reference patterns, the bias Hamiltonian of equation (19) may still be employed, and the input pattern vectors are modified $$\xi^{inp} = \left[\xi_{non-compl}^{inp}, \underbrace{0, \ldots, 0}_{N-n \text{ times}}\right] \quad (20)$$

In an alternative embodiment, an oracle Hamiltonian is used as an input Hamiltonian. The oracle Hamiltonian is in particular useful for the implementation of an associative memory. One example of an oracle Hamiltonian reads:

$$H_{inp}^2 = \Lambda \left(1_N - \sum_{k=0}^{2^{N-n}-1} |\psi_k^{inp}\rangle\langle\psi_k^{inp}|\right) \quad (21)$$

wherein $\Lambda$ is a weight factor and $|\psi_k^{inp}\rangle = |\xi_{non-compl}^{inp}\rangle \otimes |k\rangle$. The oracle Hamiltonian $H_{inp}^2$ is a diagonal matrix having 1 in every position along the diagonal except at the positions corresponding to columns m and rows m with m being all possible completions of the input vector to N entries. The latter are set to zero. The oracle Hamiltonian $H_{inp}$ increases the energy levels of the patterns which do not complete the input vector. Hence, in terms of the quantum-adiabatic protocol, a computation result can be achieved as the ground state of the final Hamiltonian.

In another possibility to implement pattern recognition an alternative oracle Hamiltonian may be employed:

$$H_{inp}^3 = \lambda(1_N - |\psi^{inp}\rangle\langle\psi^{inp}|). \quad (22)$$

The relevant input states may be defined as $|\psi^{inp}\rangle = \Sigma_k a_k^\xi |k\rangle$, wherein binominal distributional coefficients are used:

$$|a_k^\xi|^2 = q^{f_H(k,\xi)}(1-q)^{N-f_H(k,\xi)} \quad (23)$$

wherein $0 < q < 0.5$ and $f_H(a, b)$ is a Hamming distance between two patterns a, b corresponding to the basis vectors. The Hamming distance for two vectors of equal length is the number of positions for which the vectors are different.

Another input Hamiltonian which is similar to the hybrid Hamiltonian $H_{mem}^6$ may be defined for an associated memory input Hamiltonian:

$$H_{inp}^4 = H_{inp}^{non\text{-}compl} \otimes 1_{N-n} \tag{24}$$

with $$H_{inp}^{non\text{-}compl} = \sigma^{\xi_1^{inp}} \otimes \sigma^{\xi_2^{inp}} \otimes \sigma^{\xi_n^{inp}} \quad \text{and} \quad \sigma^k = \frac{1}{2}(1_1 - k\sigma^z).$$

By choosing the appropriate memory Hamiltonians and input Hamiltonians or a quantum system with an easy to prepare a ground state, the adiabatic time evolution can be initiated according to equations (8) and (9).

Differing from conventional pattern recognition methods, an adiabatic solution of a Hamiltonian approach with conditional dynamics is realized. The conditions are due to memory and input patterns and a quantum computer system for pattern recognition and associative memories can be formed. Advantageously, a bias Hamiltonian realizing an external field may have an effect on the energy spectrum of the system. This allows a measurement of the relevance of the input pattern, i. e. a measure of the similarity between the input pattern and one of the reference patterns.

The actual quantum-adiabatic evolution may be realized as a quantum simulation, for example for nuclear magnetic resonance or as an implementation in terms of superconducting devices or spin systems. Since the quantum-mechanical effects are dominant at very low energies, potentially a nanoscale implementation of a quantum computer is feasible. This means that very low energy consumption is present. Alternatively mesoscopic systems exhibiting quantum effects at almost room temperature may be used as quantum computers.

Quantum Computer

FIG. 2 shows a block-diagram of an exemplary quantum computer which may be suitable for the quantum adiabatic pattern recognition.

An input pattern INP is input to a processor 2. The processor 2 also receives information on the reference patterns 3. The processor 2, for example, may be implemented as a conventional computer. Since the actual computation is performed through a quantum system 5, an application unit 4 is provided that receives control signals CT from the processor 2 and initiates appropriate physical transformations on the quantum system 5. These physical transformations depend on the physical design of the quantum system used for computation. For example, the physical transformations may comprise radio-frequency pulses, laser fields or magnetic fields. The physical transformations are controlled by the application unit 4 and are applied directly to the quantum hardware 5. The physical transformations are in line with the Hamiltonians presented before.

Since the quantum system 5 evolves adiabatically to a quantum system according to a final Hamiltonian, the computational result is retrieved by measuring a quantum state of the quantum-system 5. This is done by a measurement unit 6 that provides corresponding measurement signals MT to another processor 7 for further evaluation. This processor 7 interprets measurement results MT and provides probability matches for the similarity between the input pattern INP and at least one of the reference patterns 3. This can be, for example a value of an overlap integral between an input pattern state and a reference pattern state evolving in time according to the adiabatic changes. As a result, the similarity probability OVL is directly connected to a recognition result, i. e. processor 7 outputs a designated reference pattern that corresponds best to the input pattern INP.

The term "processor" may refer to a conventional computer, for example for simulating quantum-mechanical effects or a quantum-system itself that provides for observable quantum states and therefore quantum-computational results. Also a distributed network of conventional computers may be employed for such purposes. E. g. this can be arranged as a peer-to-peer network used for distributed computation, where client devices perform specific computational tasks.

As an example for the quantum-computational environment, i. e. a quantum computer or quantum system, a large number of molecules may be employed. The involved atoms have nuclea spins corresponding to individual qubits. However, since single nuclear spins may be difficult to detect, the quantum-computational steps can also be performed on an ensemble of a large number of molecules. The number of molecules can be in the order of $10^{20}$.

An alanine molecule having two $^{13}C$ carbon atoms that can be employed as qubits is an exemplary quantum computer system. Alanine comprises three atoms of carbon, $^{13}C$ nuclei. FIG. 3 shows a structural diagram of alanine. The molecules may be dissolved in a liquid and loaded into a thin glass walled tube. The sample can then be inserted into the core of a superconducting magnet representing the main component of a NMR-spectrometer. The static magnetic field then aligns the qubit spins for setting up the quantum-computation process.

Figure 4:
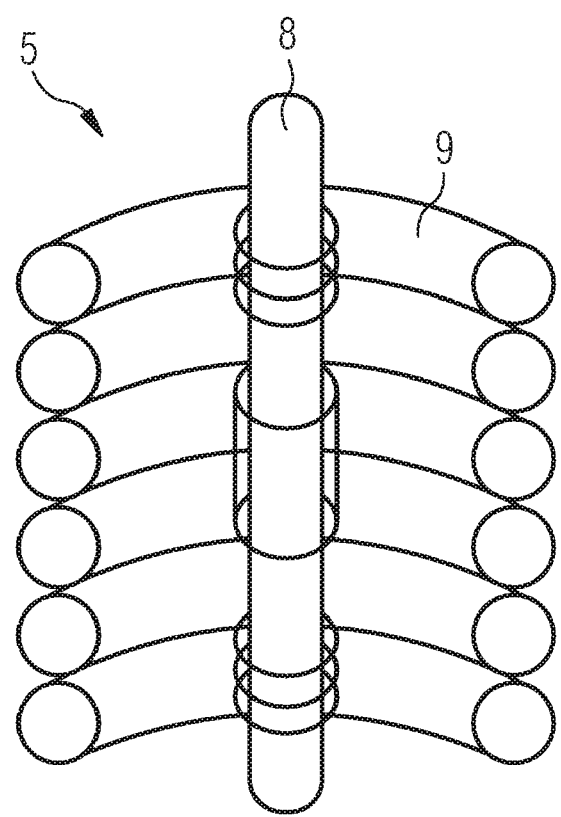
FIG. 4 shows an exemplary embodiment of a quantum system.

FIG. 4 shows an illustration of the quantum system 5 comprising a sample 8 with the alanine molecules which is surrounded by a circular coil 9 applying radio frequency pulses and magnetic fields to the molecule ensemble in the sample 8. Since the qubits have characteristic precession frequencies they may be identified and addressed by resonant electromagnetic fields. The hardware control, i. e. the application of physical transformations to this quantum system 5 can be encoded as a sequence of Hamiltonians H(s) as elaborated with respect to the quantum-adiabatic protocol above. The effective Hamiltonian of the molecules in the sample 8 can be customized by combining time periods of a natural evolution under the physical Hamiltonian with the application of sequences of radio frequency pulses. The average Hamiltonian during the sequence of frequency pulses can then be manipulated for achieving the Hamiltonian H(s) of equation (7). Hence, the quantum computation or protocol is executed.

The precessing spins produce a combined magnetic field that induces oscillating currents, in the surrounding coils 9 thereby allowing the observation of quantum states of the ensemble in the sample 8. This may be done by measuring the amplitude and phase of the current and its time-dependence. The measurement result is an average of all of the molecules independently operating as quantum-computing units and represents the answer to the computational problem defined through the Hamiltonian H(s).

Examples of Pattern Recognition

In the following, examples for pattern recognition employing the elaborated quantum-adiabatic protocol and quantum-computing strategy are illustrated. The following parameters are employed throughout the exemplary simulations:

T=300 run-time steps, Δt=1, Γ=0.1, λ=1, q=0.1, and a linear interpolation for the total run-time is used in terms of $$f\left(s=\frac{t}{T}\right)=1-s \text{ and } g\left(s=\frac{t}{T}\right)=s \quad (25)$$

For pattern recognition, two exemplary bipolar pattern sets are used:

$$\text{pattern1} = \begin{pmatrix} -1 & 1 & 1 & 1 & 1 \\ -1 & -1 & 1 & 1 & -1 \end{pmatrix}$$

$$\text{pattern2} = \begin{pmatrix} 1 & -1 & 1 & -1 & 1 \\ 1 & 1 & -1 & -1 & 1 \end{pmatrix}$$

which correspond in a binary transcription to $$\text{pattern1} = \begin{pmatrix} 0 & 1 & 1 & 1 & 1 \\ 0 & 0 & 1 & 1 & 0 \end{pmatrix}$$

$$\text{pattern2} = \begin{pmatrix} 1 & 0 & 1 & 0 & 1 \\ 1 & 1 & 0 & 0 & 1 \end{pmatrix}$$

As an input pattern, the following vector is used as an example:

inputpatt=(1 −1 1 1 1)corresponding in a binary form to inputpatt=(1 0 1 1 1).

Figure 5:
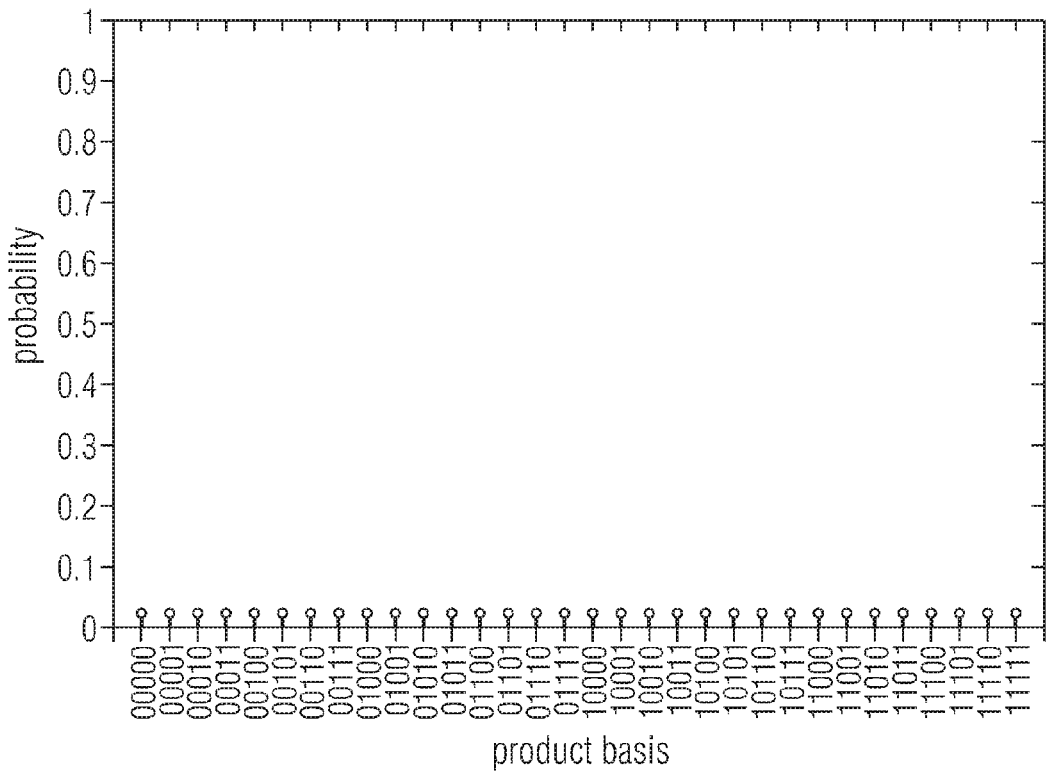
FIG. 5 shows an exemplary probability distribution for a basis state.

In the beginning state of the corresponding quantum system an equal distribution for the probability amplitudes in terms of the basis states occurs. This is illustrated in FIG. 5 showing the probability for the starting or beginning state of the system for the 32 possible states on the x-axis. Since there are 32 possible states, the equal distribution leads to a probability of 1/32 for each basis state. The Hamming distance between inputpatt and the two pattern1-reference vectors, i. e. the two rows of the pattern1 matrix, is 2 in both cases for the upper and lower row. The Hamming distance for inputpatt with respect to pattern2 is 1 for the upper row and 3 for the lower row.

Figure 6:
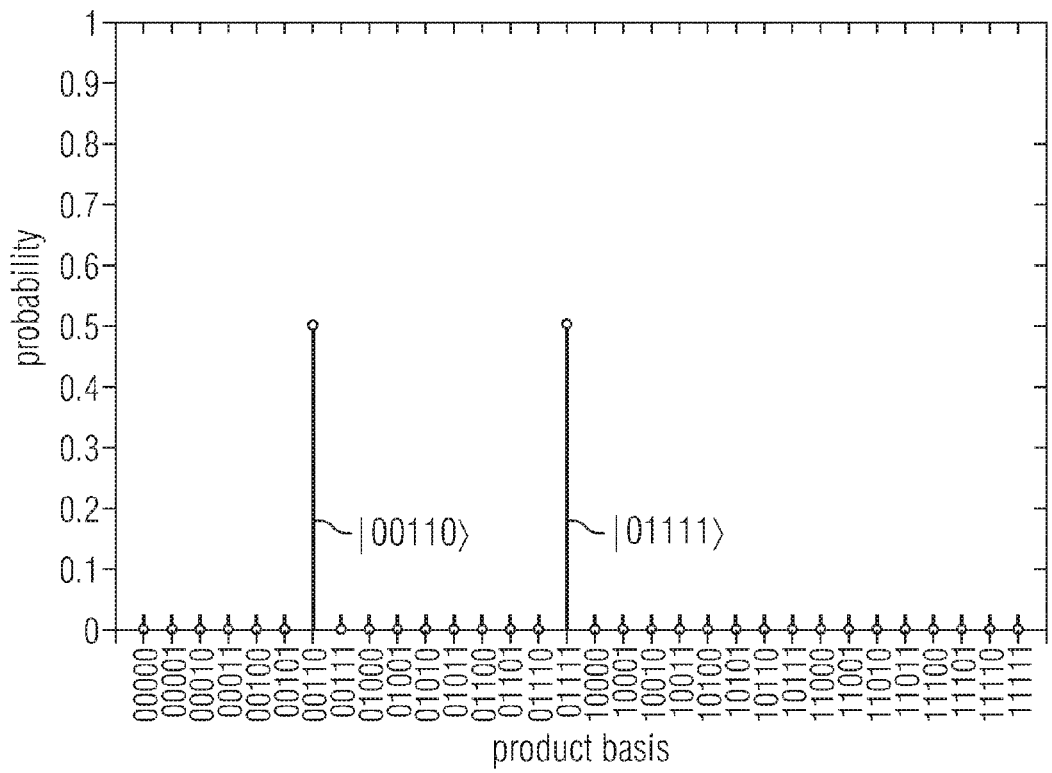
FIG. 6 shows an exemplary probability distribution for recognized pattern states according to a first example.

Employing the bias Hamiltonian approach according to equation (19), the probability distribution for pattern1 is expected to show the same probability for the final measurement for the binary states $|01111\rangle$ and $|00110\rangle$. The probabilities shall be 0.5 each. This is the correct result because the memorized reference patterns, i. e. the upper row and the lower row have the same Hamming distance with respect to the input pattern in pattern1. This is shown in FIG. 6 where the product basis is on the x-axis and the corresponding probability on the y-axis. The upper- and lower-row patterns both have the same probability. This means both patterns are recognized as being similar to the input pattern inputpatt.

Figure 7:
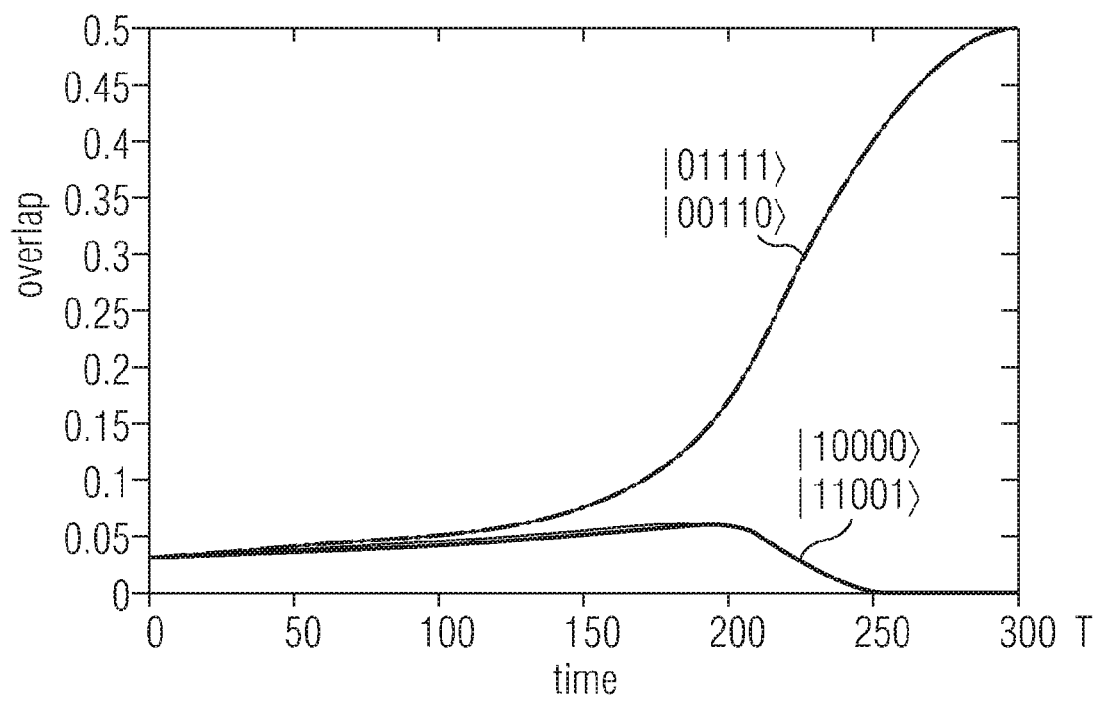
FIG. 7 shows the time evolution of an overlap integral between actual states of the quantum system and input pattern states over time according to the first example.

Next, an overlap integral of the reference pattern with the actual state of the system $|\Psi(t)\rangle$ is shown. The overlap reads:

$$\text{overlap}_k(t) = |\langle k|\psi(t)\rangle|^2, \quad (26)$$

wherein k refers to the upper and lower rows of pattern1 as well as to mirror patterns corresponding to the inversion. In the Hamiltonian $H_{mem}^1$ employed for the interaction also the mirror patterns are reflected. FIG. 7 shows the time evolution of the overlap integral, wherein the dash-dotted line shows the values of the actual state of the quantum system for patterns 01111 and 00110. Both curves are on top of each other. The lower solid curve shows the overlap integral for the mirror patterns 10000 and 11001. It can be seen that between t=40 and t=T=300 the overlap integral increases for the most similar reference patterns with the input pattern and decreases for the mirror patterns.

Figure 8:
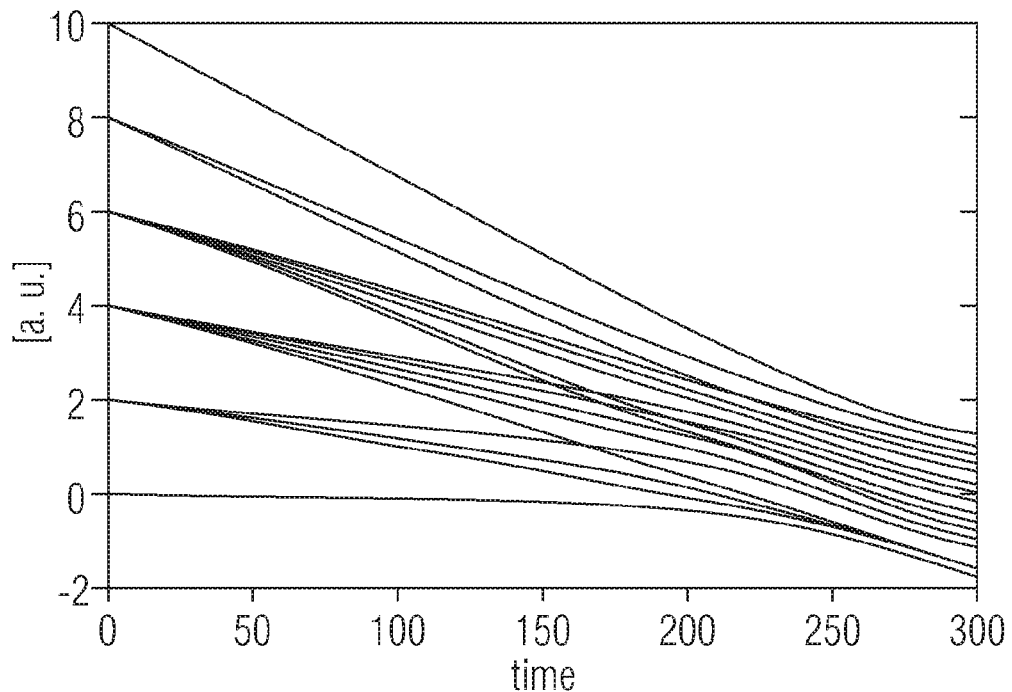
FIG. 8 shows the time evolution of an energy spectrum of the quantum system according to the first example.

FIG. 8 shows the spectrum of the adiabatically evolving quantum system, wherein the ground state of the final Hamiltonian at t=300 is degenerated thereby reflecting again the same probability for the upper and lower row reference patterns as shown in the dash-dotted curve for the overlap integral.

Figure 9:
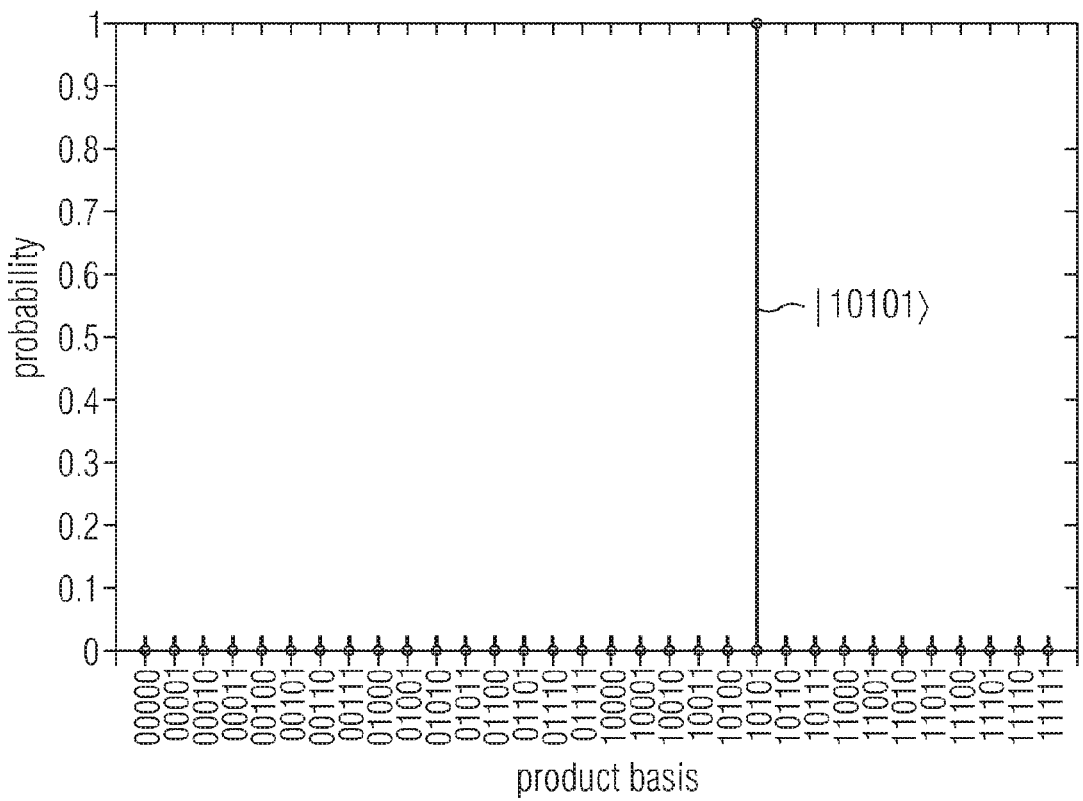
FIG. 9 shows an exemplary probability distribution for a recognized pattern state according to a second example.

Similar curves can be obtained for the second pattern pattern2 as input pattern to the quantum system, however, the pattern state $|1010\rangle$ is expected to have probability 1 because in the first pattern1 the upper-row pattern in the matrix pattern2 has a smaller Hamming distance with respect to the input pattern than has the lower row pattern. This probability distribution is shown in FIG. 9.

Figure 10:
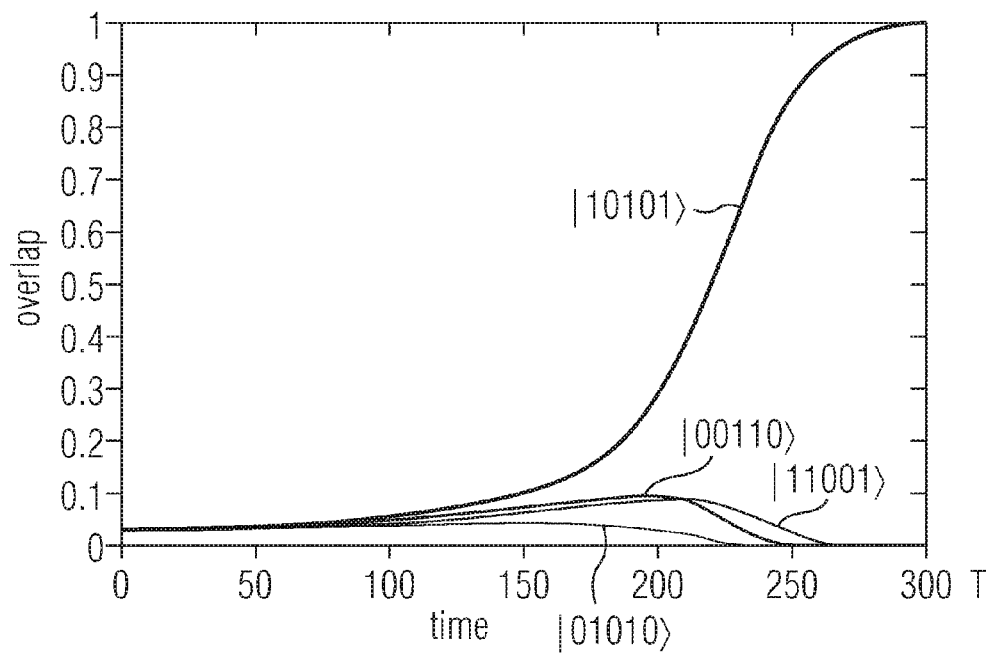
FIG. 10 shows the time evolution of an overlap integral between actual states of the quantum system and the input pattern state over time according to the second example.

FIG. 10 shows the overlap integral for the pattern state $|1010\rangle$ which is recognized, and the overlap for the lower-row pattern state $|00110\rangle$ and the mirror patterns 11001 and 01010. As expected, during this quantum-system simulation, the quantum system prefers a state $|10101\rangle$.

Figure 11:
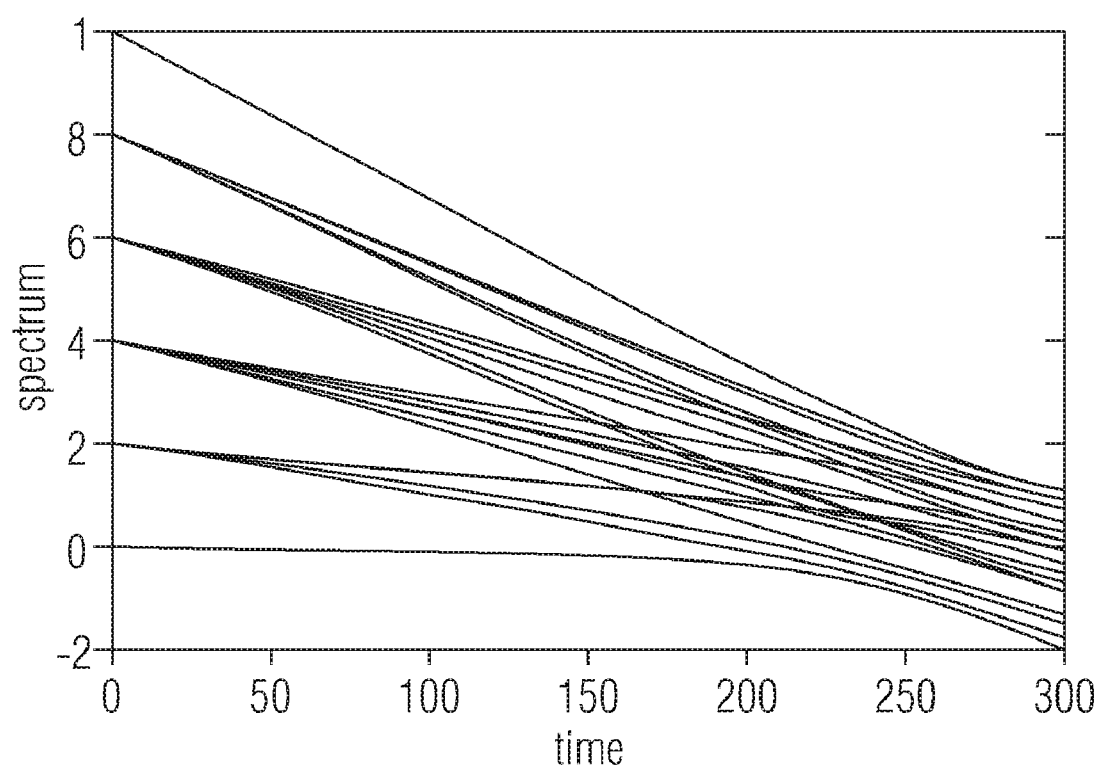
FIG. 11 shows the time evolution of an energy spectrum of the quantum system according to the second example.

This is also reflected in the time evolution of the spectrum of the quantum system which is shown in FIG. 11. The ground state, in fact, in contrast to the ground state shown in FIG. 8, is not degenerated. This means, a single pattern of the memorized reference patterns is recognized as matching best to the input pattern. Similar results are obtained from quantum simulations employing an oracle Hamiltonian according to equation (17).

Examples of Associative Memory

Next, we consider a bipolar pattern set for reference patterns:

$$\text{pattern} = \begin{pmatrix} 1 & -1 & 1 & -1 & 1 & 1 \\ 1 & 1 & -1 & -1 & -1 & 1 \\ 1 & -1 & 1 & -1 & 1 & -1 \end{pmatrix}$$

which corresponds to a binary transcription $$\text{pattern} = \begin{pmatrix} 1 & 0 & 1 & 0 & 1 & 1 \\ 1 & 1 & 0 & 0 & 0 & 1 \\ 1 & 0 & 1 & 0 & 1 & 0 \end{pmatrix}.$$

As input patterns two incomplete input patterns are considered:
inputpatt1=(1 −1 1 −1 1)
inputpatt2=(1 1 −1 −1 −1),
corresponding to binary patterns
inputpatt 1=(1 0 1 0 1)
inputpatt 2=(1 1 0 0 0).

For (incomplete) pattern recognition or associative memory modeling, the projection rule definition of the interaction matrix according to equation (16) is used for the input Hamiltonian.

Figure 12:
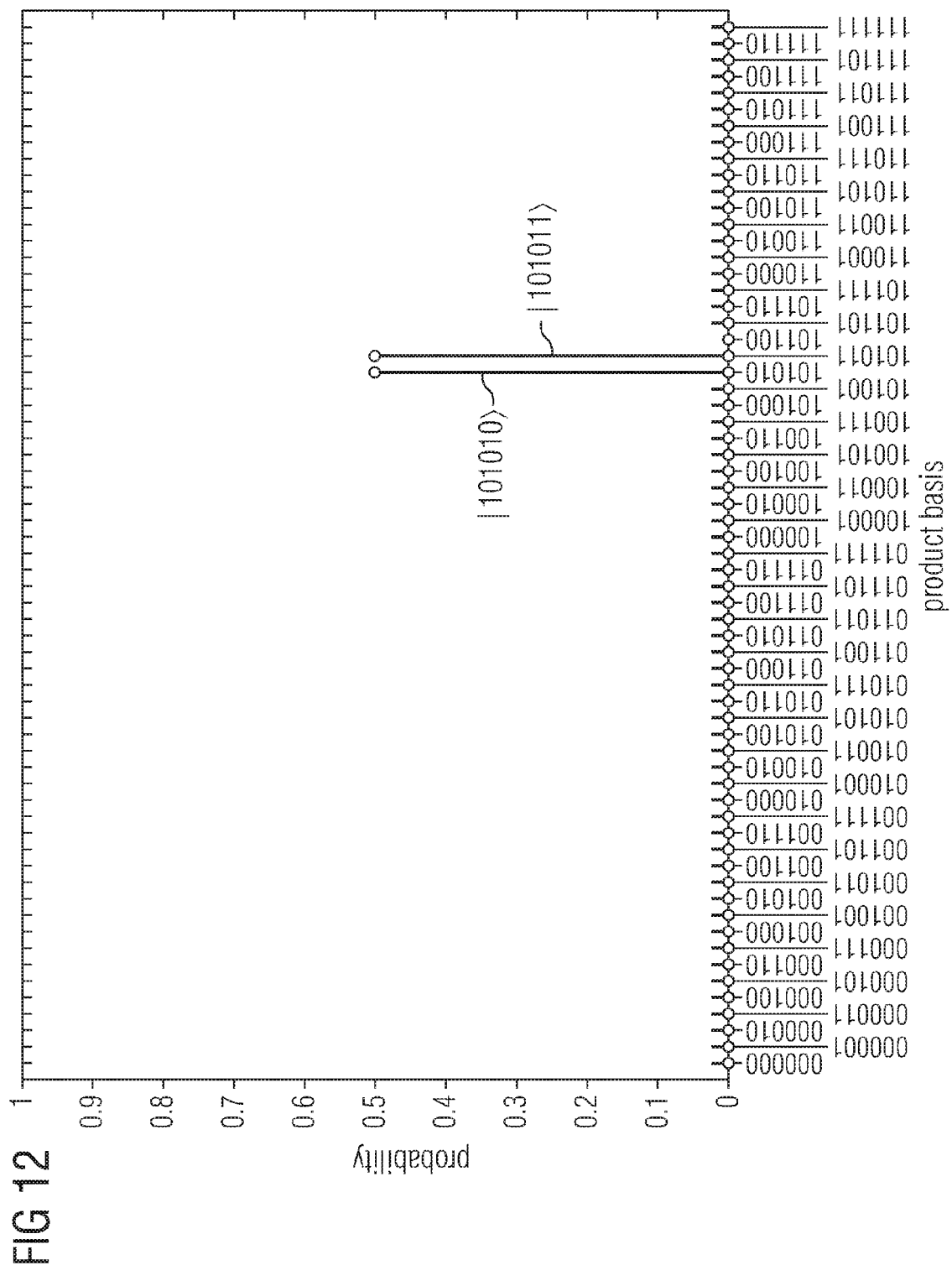
FIG. 12 shows an exemplary probability distribution for recognized pattern states according to a third example.

First considering inputpatt1, the probability for measuring the input pattern inputpatt1 corresponds to equal probabilities off 0.5 for the binary states $|01010\rangle$ and $|101011\rangle$. Both patterns, i. e. the upper and the lower row of the reference pattern matrix complete the input vector 10101. This probability distribution is shown in FIG. 12.

Figure 13:
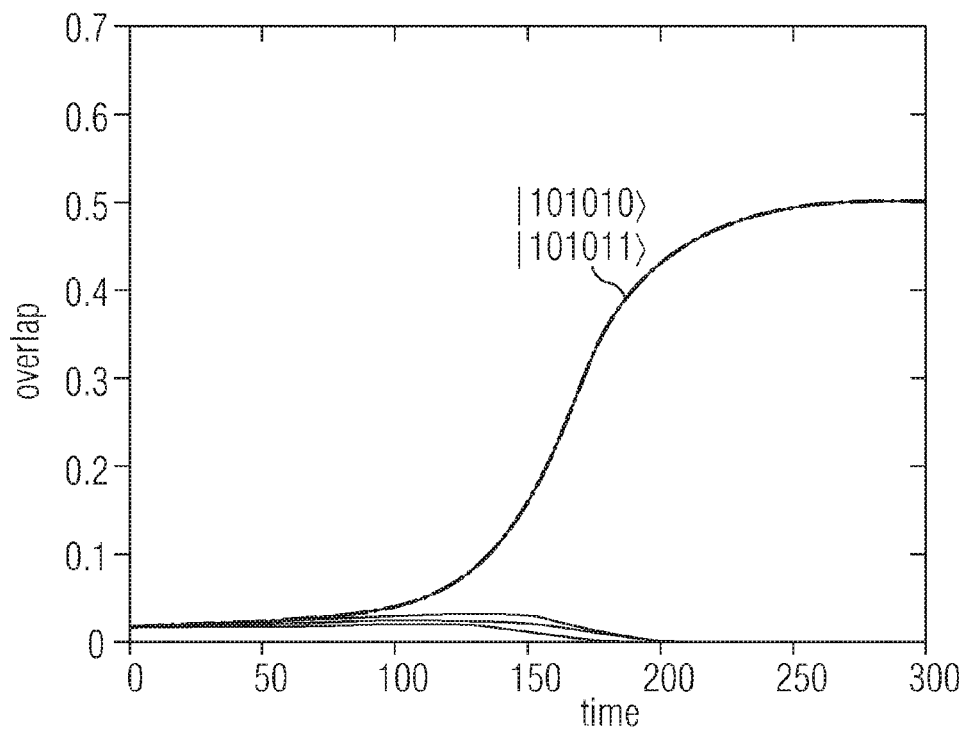
FIG. 13 shows the time evolution of an overlap integral between actual states of the quantum system and input pattern states over time according to the third example.

Again, the overlap between the current state of the system depending on the stored reference patterns and the mirror patterns is calculated and illustrated in the next FIG. 13. Because two states refer to reference patterns that complement the input pattern correctly, the dash-dotted line refers to two overlap integrals relating to states $|101010\rangle$ and $|101011\rangle$. The lower curves vanishing approximately after t=200 correspond to the other reference pattern vectors and their mirror patterns. Since two reference patterns do match with the input pattern or complement the input pattern correctly, respectively, this is also reflected in the spectrum of the quantum-system.

Figure 14:
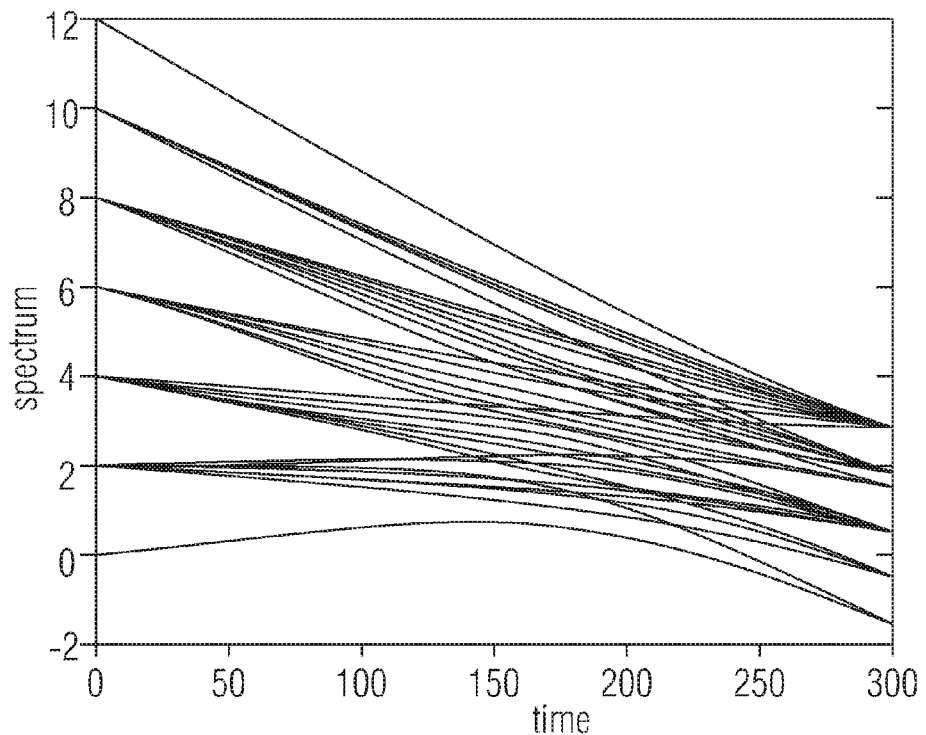
FIG. 14 shows the time evolution of an energy spectrum of the quantum system according to the third example.

FIG. 14 shows the time evolution of the spectrum. In particular, the ground state is now degenerated at the end of the simulation t=T=300. This corresponds to the two recognized states or patterns 101010 and 101011.

Figure 15:
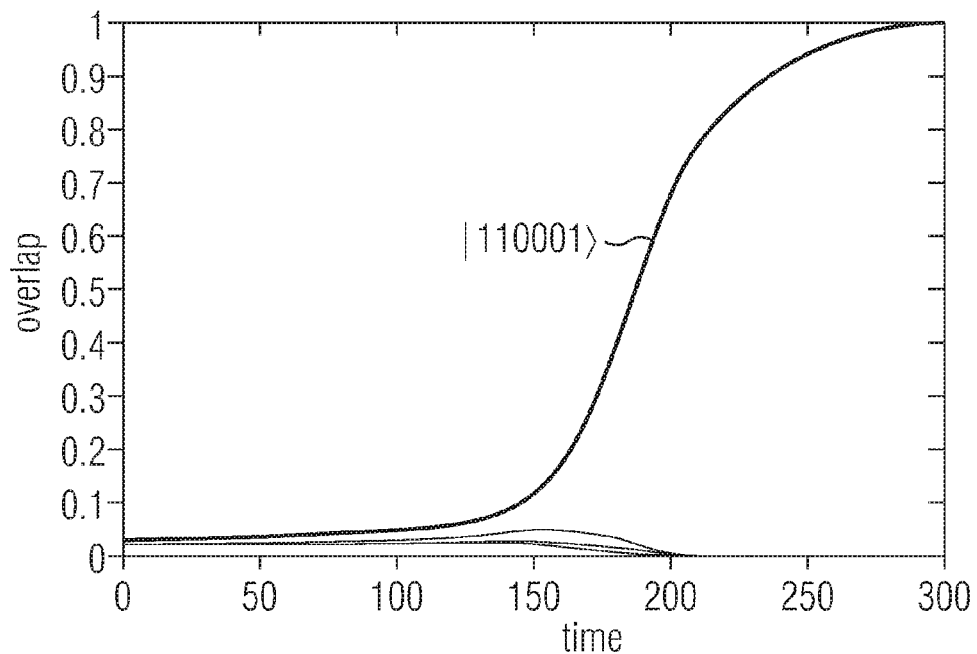
FIG. 15 shows the time evolution of an overlap integral between actual quantum states of the quantum system and input pattern states over time according to a forth example.

Next, the input pattern inputpatt2=11000 is used, wherein as the recognition result the unique state $|110001\rangle$ must be retrieved. Again, the overlap integrals with respect to the state $|110001\rangle$ evolves according to the adiabatic time evolution to the most probable state having a probability of approximately 1. This is illustrated in FIG. 15. The other overlap integrals vanish over the time evolution. Hence, by measuring the overlap integral as an observable or the spectrum of the adiabatically evolved quantum system, the correct recognition result with a probability of 100% is retrieved.

Figure 16:
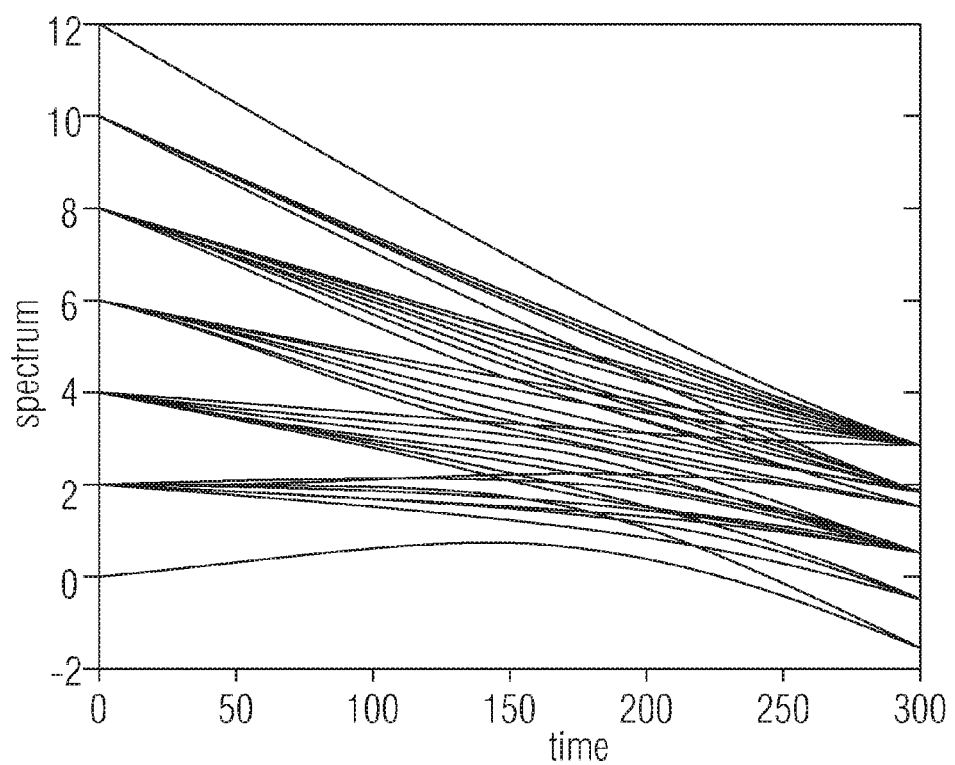
FIG. 16 shows the time evolution of an energy spectrum of the quantum system according to the forth example.

In FIG. 16, the corresponding spectrum in arbitrary units over time is shown. Since a unique state $|110001\rangle$ matches best with the input pattern, the ground state is non-degenerated at T=300.

Similar or same results are obtained when utilizing the bias Hamiltonian and the projection-rule approach for the interaction matrix. The pattern recognition and the associative memory can be efficiently implemented through a quantum computer. Since the quantum system adiabatically evolves, for example controlled by a dedicated processor applying physical transformations to the quantum system through a measurement, the quantum system collapses into the computation result, i. e. into the state resembling the input pattern best.

The invention claimed is:

1. A quantum computer for pattern recognition, comprising a memory storing reference patterns; and
at least one processor determining, for at least one quantum system, transformations of Hamiltonian dynamics calculated on the basis of an initial Hamiltonian indicating an initial quantum state of said quantum system, adiabatic weighting functions and a final Hamiltonian, the final Hamiltonian being calculated depending on an input pattern Hamiltonian and Hamiltonians of said reference patterns which are applied to generate a final quantum state of said quantum system, said at least one processor determining a probability of similarity between said input pattern and said reference patterns depending on the final quantum state of said quantum system.

2. The quantum computer according to claim 1, wherein said quantum computer comprises an application unit for application of said transformations to said quantum system depending on the Hamiltonian dynamics calculated by said processor.

3. The quantum computer according to claim 1, wherein said quantum computer comprises a measurement unit for measuring said final quantum state of said quantum system.

4. The quantum computer according to claim 1, wherein said transformations of Hamiltonian dynamics are performed through a plurality of distributed computation devices.

5. The quantum computer according to claim 1, wherein a processor calculates probabilities of a similarity between said input pattern and said reference patterns stored in a memory depending on said measured final quantum state of said quantum system.

6. The quantum computer according to claim 5, wherein the quantum system is a simulated quantum system.

7. The quantum computer according to claim 5, wherein the quantum system is a physical quantum system.

8. The quantum computer according to claim 7, wherein the physical quantum system comprises at least one of the group of:
a trapped ion quantum computer,
a liquid NMR quantum computer,
a solid state NMR quantum computer,
a superconductor based quantum computer,
a quantum dot computer,
a cavity quantum electro-dynamic based quantum computer,
a Fullerene based ESR quantum computer,
a diamond based quantum computer,
an optic based quantum computer or
a spin based quantum computer.

9. An apparatus for pattern recognition comprising:
a quantum system exhibiting quantum dynamic states;
at least one processor determining a final Hamiltonian depending on an input pattern Hamiltonian applied to said processor and Hamiltonians of reference patterns stored in a memory and calculating Hamiltonian dynamics depending on said final Hamiltonian, adiabatic weighting functions and an initial Hamiltonian indicating an initial state of said quantum system;
an application unit applying transformations to said quantum system depending on the Hamiltonian dynamics calculated by said processor; and
a measurement unit measuring a final quantum state of said quantum system depending on which the processor calculates probabilities of similarities between said input pattern and said reference pattern stored in said memory.

10. The apparatus of claim 9, further comprising
means for inputting a pattern;
means for providing at least two reference patterns;
means for calculating a final Hamiltonian depending on the input pattern and said reference patterns;
means for calculating Hamiltonian dynamics depending on said final Hamiltonian, adiabatic weighting functions and an initial Hamiltonian indicating an initial state of said quantum system;
means for applying a sequence of physical transformations to said quantum system depending on said Hamiltonian dynamics; and
means for calculating probabilities of a similarity between said input pattern and said reference patterns depending on a measured final quantum state of said quantum system.

11. A method for pattern recognition comprising:
providing an input pattern and at least two reference patterns;
calculating a final Hamiltonian depending on a Hamiltonian of said input pattern and Hamiltonians of said reference patterns;
calculating Hamiltonian dynamics depending on said final Hamiltonian, adiabatic weighting functions and an initial Hamiltonian indicating an initial state of a quantum system;
applying physical transformations to said quantum system depending on said Hamiltonian dynamics; and
calculating probabilities of a similarity between said input pattern and said reference pattern depending on a final quantum state of said quantum system.

12. The method according to claim 11, further comprising storing the reference patterns in a memory.

13. The method according to claim 11, further comprising calculating a control function depending on said Hamiltonian dynamics.

14. The method according to claim 13, further comprising generating a sequence of physical transformations depending on said control function.

15. The method according to claim 14, wherein the control function controls a device applying said physical transformations to said quantum system.

16. The method according to claim 11, wherein the quantum system is formed by a physical quantum system.

17. The method according to claim 11, wherein said quantum system is formed by a simulated quantum system.

18. The method according to claim 17, further comprising automatically completing an input pattern, having a high similarity with a reference pattern indicated by a high calculated probability, to resemble one or more reference patterns.

19. The method according to claim 16, wherein said physical quantum system exhibits quantum dynamic states.

20. The method according to claim 19, wherein said physical quantum system comprises at least one of the group of:
a trapped ion quantum computer,
a liquid NMR quantum computer,
a solid state NMR quantum computer,
a superconductor based quantum computer,
a quantum dot computer,
a cavity quantum electric dynamic based quantum computer,
a Fullerene based ESR quantum computer,
a diamond based quantum computer,
an optic based quantum computer, or
a spin based quantum computer.

21. A data carrier for storing a computer program that when executed by at least one processor causes the at least one processor to perform a method according to claim 20.

22. At least one computer readable medium encoded with at least one computer program that when executed by a distributed network of computing devices causes the computing devices to perform a method of pattern recognition, comprising:
receiving an input pattern;
obtaining at least two reference patterns;
calculating a final Hamiltonian depending on a Hamiltonian of the input pattern and Hamiltonians of the reference patterns;
calculating Hamiltonian dynamics depending on the final Hamiltonian, adiabatic weighting functions and an initial Hamiltonian indicating an initial state of a quantum system;
applying physical transformations to the quantum system depending on the Hamiltonian dynamics;
calculating probabilities of a similarity between the input pattern and the reference pattern depending on a final quantum state of the quantum system; and
outputting an indication of extent of recognition of the input pattern based on the probabilities of similarity.

* * * * *